(12) United States Patent
Baer et al.

(10) Patent No.: US 7,460,711 B2
(45) Date of Patent: Dec. 2, 2008

(54) EFFICIENT METHOD FOR READING METER VALUES BY PROCESSING DIGITAL IMAGES OF A METER

(75) Inventors: Richard L. Baer, Los Altos, CA (US); Mark M Butterworth, Santa Clara, CA (US); Peter H. Mahowald, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 877 days.

(21) Appl. No.: 10/927,712

(22) Filed: Aug. 27, 2004

(65) Prior Publication Data

US 2006/0045339 A1    Mar. 2, 2006

(51) Int. Cl.
*G06K 9/00* (2006.01)
(52) U.S. Cl. .............. 382/181; 382/321; 382/177; 382/276; 382/100
(58) Field of Classification Search .......... 382/177, 382/181
See application file for complete search history.

(56) References Cited

U.S. PATENT DOCUMENTS

| 6,473,517 | B1 * | 10/2002 | Tyan et al. ............ 382/105 |
| 2002/0131642 | A1 * | 9/2002 | Lee et al. ............ 382/220 |
| 2003/0007690 | A1 * | 1/2003 | Rajagopal et al. ...... 382/209 |
| 2003/0138146 | A1 * | 7/2003 | Johnson et al. ........ 382/190 |

* cited by examiner

*Primary Examiner*—Vikkram Bali
*Assistant Examiner*—Katrina Fujita (57) ABSTRACT

A method for reading a meter includes (1) capturing a first image of digits displayed by the meter, (2) roughly locating the digits by correlating the entire first image against symbols, (3) precisely locating the digits by correlating the digits against the symbols, which are now rotated, resized, and repositioned to maximize correlation, (4) determining and storing nominal centers of the digits in a nonvolatile memory. The method further includes (5) capturing a second image of the digits, (6) locating regions of interest in the second image according to the nominal centers, (7) determining vertical positions of full digits (or partial digits) in the regions of interest, (8) aligning symbols (or partial symbols) and the full digits (or the partial digits) according to the vertical position, and (9) correlating the symbol and the full digits (or the partial symbols and the partial digits).

6 Claims, 6 Drawing Sheets

Fig. 16

EFFICIENT METHOD FOR READING METER VALUES BY PROCESSING DIGITAL IMAGES OF A METER

DESCRIPTION OF RELATED ART

Meters are widely used by utility companies to measure the consumption of their products by residential and commercial customers. This usage information must be collected on a periodic basis in order to perform billing. Meter readers have traditionally recorded this information by visiting every meter, every month. In the future, automatic meter reading systems will be developed that can continuously monitor meter values and electronically communicate these values to a central location.

In many meters the values are displayed as a horizontal string of digits. The digits are actually symbols printed on the outsides of cylinders. The symbols are evenly spaced, and there are as many symbols as there are characters in the digital alphabet (e.g., zero through nine). A separate cylinder is used to represent each decade (in a base-10 system), and the cylinders are evenly spaced on a common axis. A faceplate that only reveals one digit position on each cylinder is used to define the display value. The assembly is driven by a rotating shaft which causes the least-significant digit to rotate on its axis. When this digit has accomplished a complete rotation, it causes the next most significant digit to increment by one digit position and so forth.

Automatic meter reading can be performed by electronically imaging the display described in the previous paragraph. The entire image could be transmitted to a central location for processing, but the energy resources of the meter reader would soon be depleted. Thus, what is needed is an efficient method for extracting the digit values at the meter and transmitting only those values.

SUMMARY

In one embodiment of the invention, a method for reading a meter includes (1) capturing a first image of digits displayed by the meter, (2) roughly locating the digits by correlating the entire first image against symbols from a symbol set, (3) precisely locating the digits by correlating the digits against the symbols, which are now rotated, resized, and repositioned to maximize correlation, (4) determining and storing nominal centers of the digits in a nonvolatile memory.

In one embodiment of the invention, the method further includes (5) capturing a second image of the digits, (6) locating regions of interest in the second image according to the nominal centers, (7) determining vertical positions of full digits (or partial digits) in the regions of interest, (8) aligning symbols (or partial symbols) and the full digits (or the partial digits) according to the vertical position, and (9) correlating the symbol and the full digits (or the partial symbols and the partial digits).

BRIEF DESCRIPTION OF THE DRAWINGS

Use of the same reference numbers in different figures indicates similar or identical elements.

DETAILED DESCRIPTION

Figure 1:
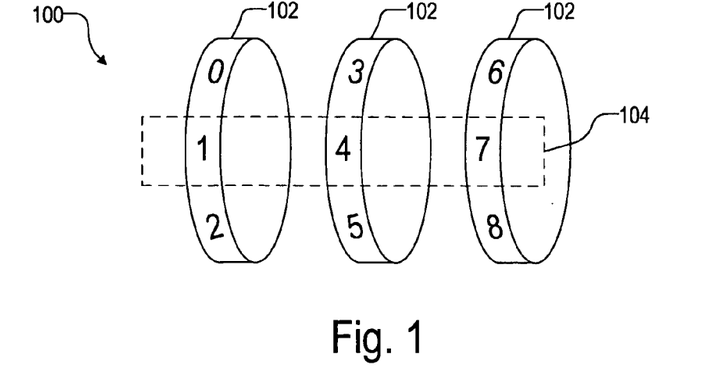
FIGS. 1 and 2 partially illustrate a conventional utility meter.
Figure 2:
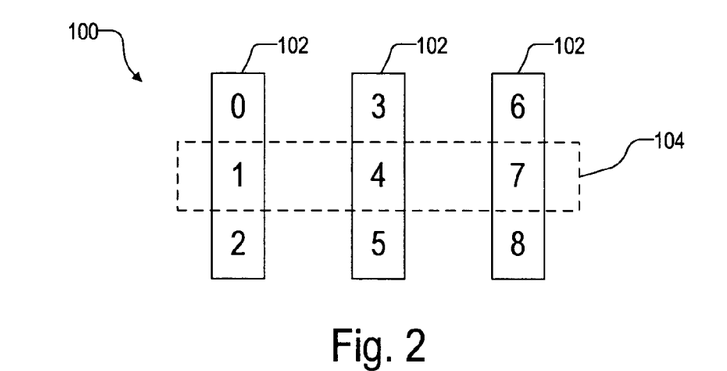

FIGS. 1 and 2 partially illustrate a conventional utility meter 100 (e.g., a water or gas meter). Meter 100 has cylinders 102 having digits printed on the outer surface to indicate the utility usage. A faceplate 104 reveals a row of digits to indicate the current utility usage.

Figure 3:
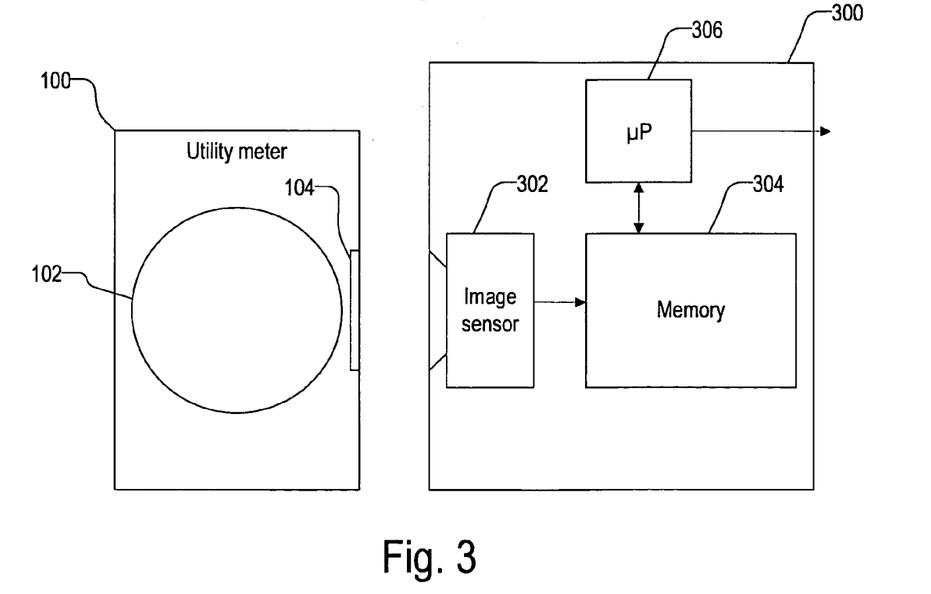
FIG. 3 illustrates a meter reading apparatus on the utility meter of FIGS. 1 and 2 in one embodiment of the invention.

FIG. 3 illustrates a meter reading apparatus 300 for reading meter 100 in one embodiment of the invention. Apparatus 300 includes an image sensor 302, a memory 304, and a microprocessor 306. Image sensor 302 captures images of the digits displayed by meter 100 and stores the images in memory 304. Microprocessor 306 executes software to determine the values of the digits from the images. Microprocessor 306 then transmits the values of the digits to a central location for billing purposes.

Figure 4:
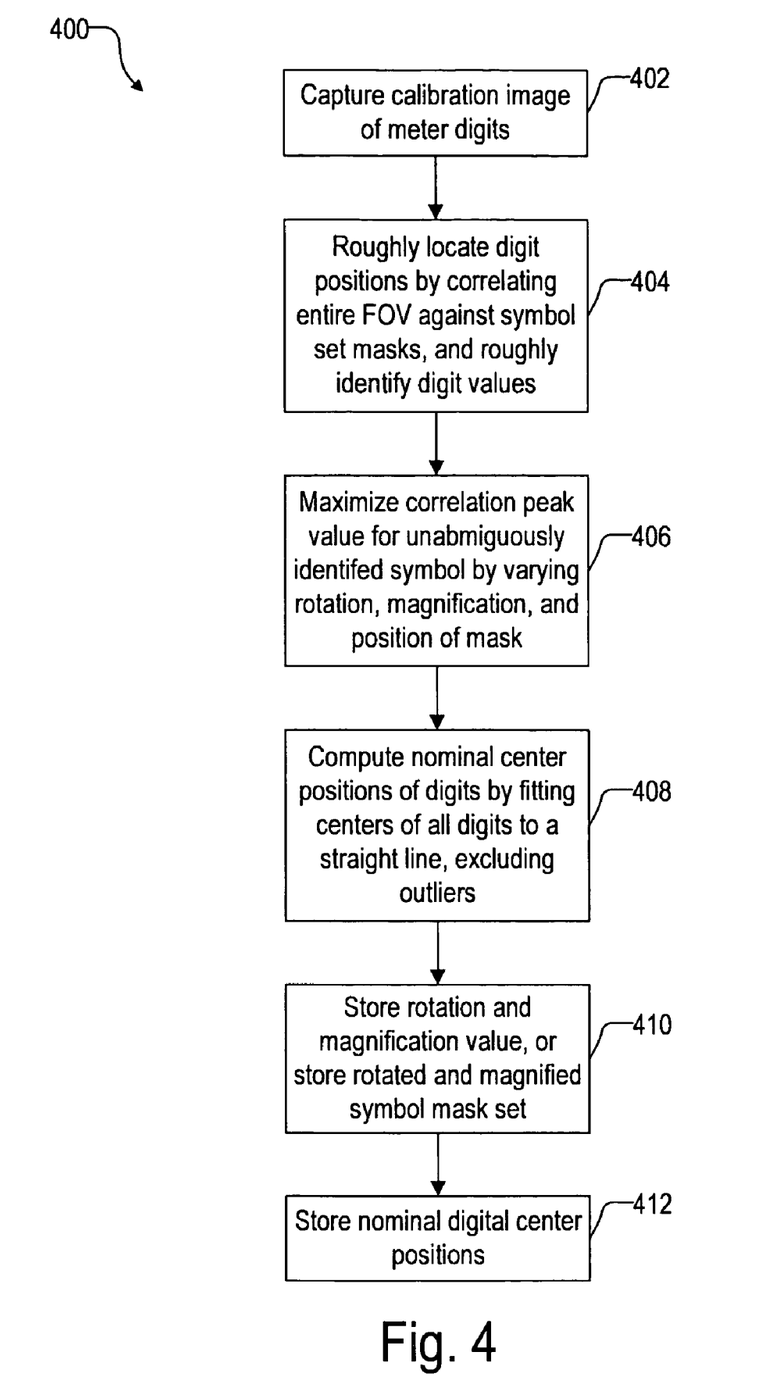
FIG. 4 is a flowchart of a method for calibrating the meter reading apparatus of FIG. 3 in one embodiment of the invention.

FIG. 4 illustrates a method 400 for calibrating apparatus 300 in one embodiment of the invention. Method 400 can be implemented with software executed by microprocessor 306.

Figure 5:
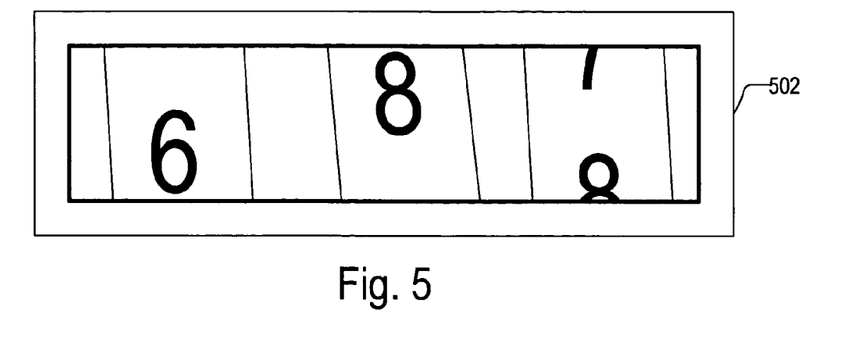
FIG. 5 illustrates a calibration image captured by the meter reading apparatus of FIG. 3 in one embodiment of the invention.

In step 402, microprocessor 306 instructs image sensor 302 to capture a calibration image 502 (FIG. 5) of meter 100. The field of view of image sensor 302 includes the horizontal string of digits displayed by meter 100. Image sensor 302 stores image 502 in memory 304.

In step 404, microprocessor 306 roughly locates the positions of the digits in image 502 by correlating the entire image against symbols from a symbol mask set. In one embodiment shown in FIG. 6A, a symbol mask set 602 consists of individual symbols 0 to 9. In another embodiment shown in FIG. 6B, a symbol mask set 604 consists of a group of symbols 0 to 9 sequentially arranged in a single mask image with known offsets A to J from the start of the image. Each individual symbol can be retrieved from the mask image because its size and offset are predetermined.

Figure 6A:
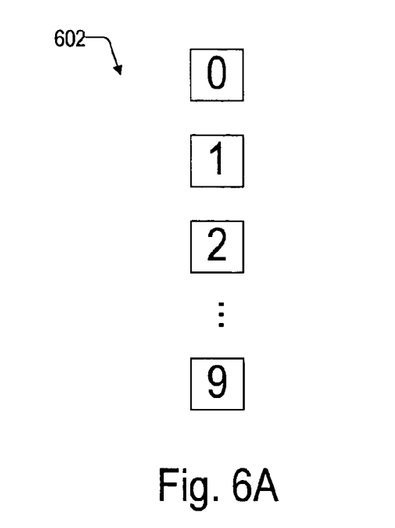
FIGS. 6A and 6B illustrate symbol mask sets for correlating the digits in embodiments of the invention.
Figure 6B:
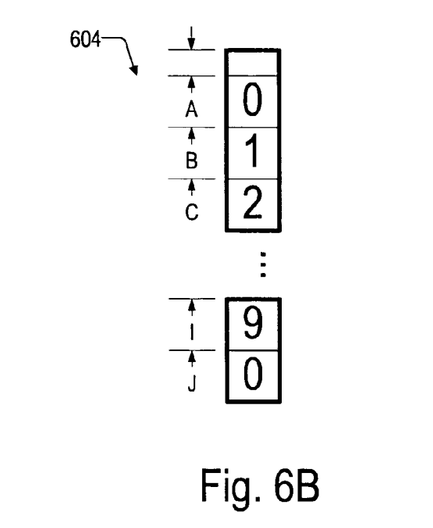
Figure 7:
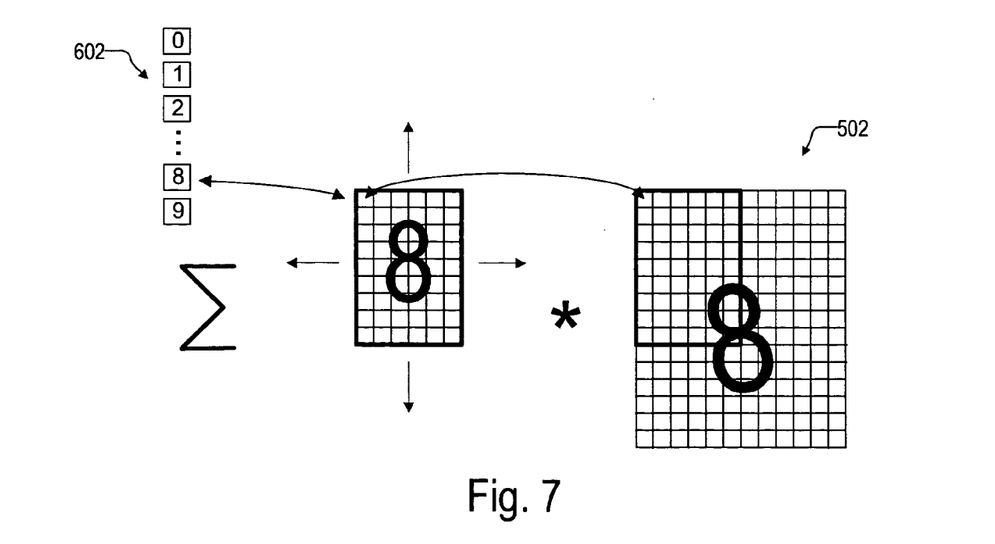
FIG. 7 illustrates the correlation of the calibration image against a symbol in one embodiment of the invention.

To correlate image 502 against the symbols, microprocessor 306 moves a selected symbol from symbol mask set 602 over image 502 one pixel position at a time until it has been correlated with the entire image 502. As illustrated in FIG. 7, at each position, microprocessor 306 multiplies the corresponding pixels of the selected symbol and the superimposed portion of image 502. At each position, microprocessor 306 sums the products as a correlation value of the selected symbol at that position.

If the correlation value at a position is greater than a threshold, then the superimposed portion of image 502 at that position possibly includes a digit. If a superimposed portion possibly has a digit, microprocessor 306 may correlate that superimposed portion against the other symbols in the symbol mask set. The digit at that position is assumed to correspond to the symbol that produces the highest correlation value. At the end of step 404, microprocessor has roughly located the digits in image 502 and roughly identified their values. In one embodiment, image 502 at a lower resolution is used to speed up step 404.

In step 406, microprocessor 306 precisely locates the positions of the digits in image 502 by maximizing the correlation of the roughly located digits against the symbols. In one embodiment, microprocessor 306 adjusts the rotation, size, and position of the symbols to maximize their correlation values. Microprocessor 306 can use a standard non-linear optimization method to adjust the rotation, size, and position of the symbols. At the end of step 406, microprocessor has precisely located the digits in image 502 and precisely identified their values. The corresponding symbols of the digits may have the same or different rotation and size that maximize their correlation values.

In step 408, microprocessor 306 determines the nominal center positions of the precisely located digits in image 502.

Figure 8:
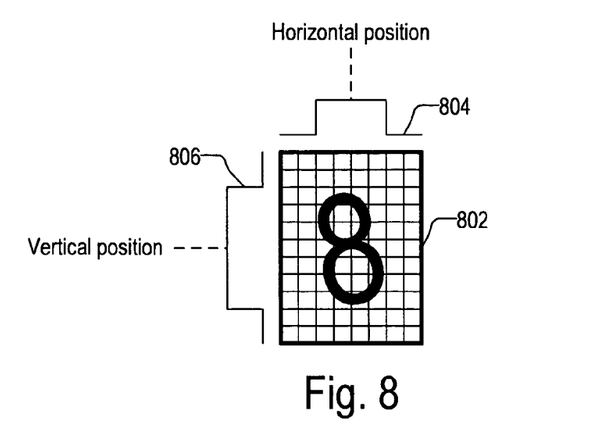
FIGS. 8 and 9 illustrate the determinations of the horizontal and vertical position of a digit in one embodiment of the invention.

In one embodiment illustrated in FIG. 8, microprocessor 306 performs the "or" operation to the pixels in the columns of an area 802 around the digit to generate a curve 804, and performs the "or" operation to the pixels in the rows of area 802 to generate a curve 806. As a result of the "or" operation, curves 804 and 806 have protruding steps. The horizontal center of the step width in curve 804 is the horizontal position of the digit, and the vertical center of the step width in curve 806 is the vertical position of the digit.

In one embodiment, the images being processed are assumed to be black and white images where each pixel is either on or off. In another embodiment, the images are grayscale images that are converted to black and white images by setting a grayscale threshold value that determines if a pixel is on or off.

Figure 9:
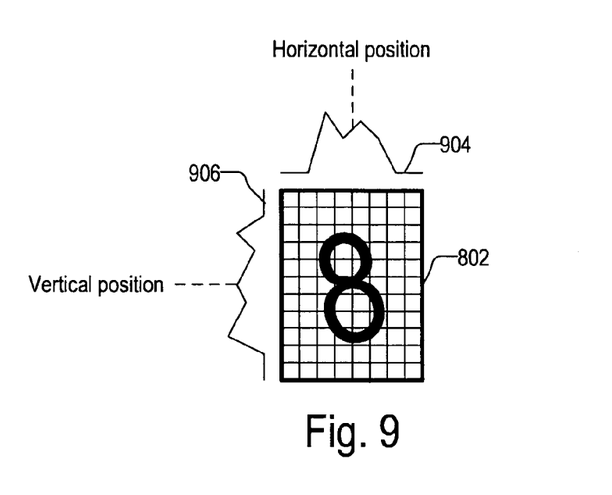

In another embodiment illustrated in FIG. 9, microprocessor 306 performs the "sum" operation to the pixels in the columns of area 802 to generate a curve 904, and performs the "sum" operation to the pixels in the rows of area 802 to generate a curve 906. As a result of the "sum" operation, curves 804 and 806 have protruding peaks. The horizontal center of the peak width in curve 904 is the horizontal position of the digit, and the vertical center of the peak width under curve 906 is the vertical position of the digit.

Figure 10:
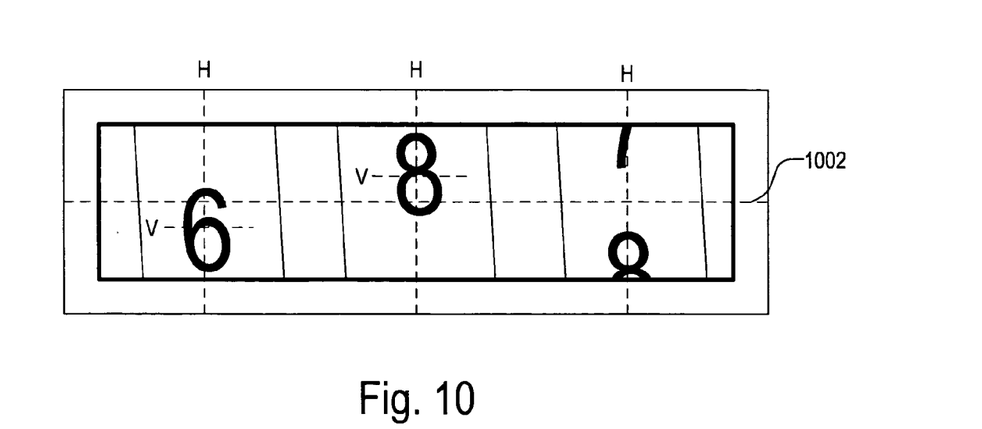
FIG. 10 illustrates the determination of a nominal vertical position of the digits in one embodiment of the invention.

The determined horizontal positions of the digits are set as the nominal horizontal positions of the digits. On the other hand, the digits all share a nominal vertical position 1002 as shown in FIG. 10. To determine nominal vertical position 1002, microprocessor 306 averages the vertical positions of the digits. In one embodiment, microprocessor 306 excludes outlying digits that have low correlation values, such as the third cylinder showing digits 7 and 8 in transition.

Figure 15:
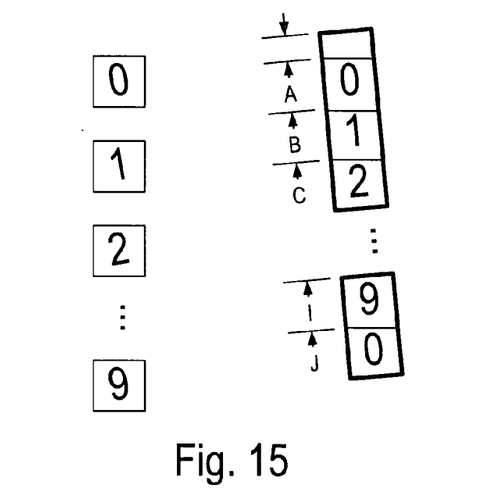
FIG. 15 illustrates the symbol mask set after being rotated and resized for correlating the digits in one embodiment of the invention.
Figure 16:
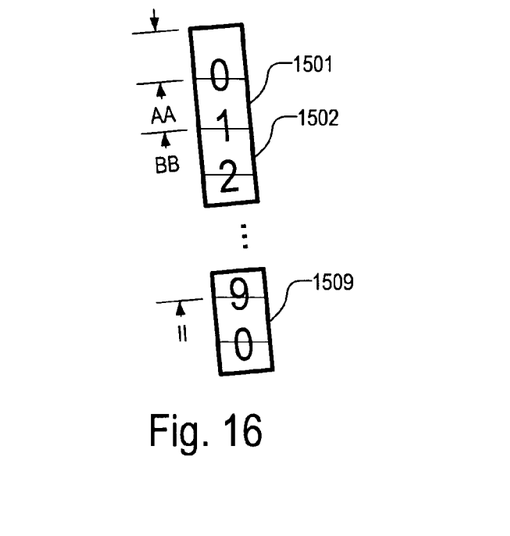
FIG. 16 illustrates retrieving portions of the symbol mask set having partial symbols for correlating partial digits in one embodiment of the invention.

In step 410, microprocessor 306 stores the rotation and the size values that maximized correlation for the digits in memory 304. Alternatively, as shown in FIG. 15, microprocessor 306 modifies the symbol mask set with the rotation and size values for the digits so they would not need to be calculated later.

In step 420, microprocessor 306 stores the nominal center positions of the digits in memory 304.

Figure 11:
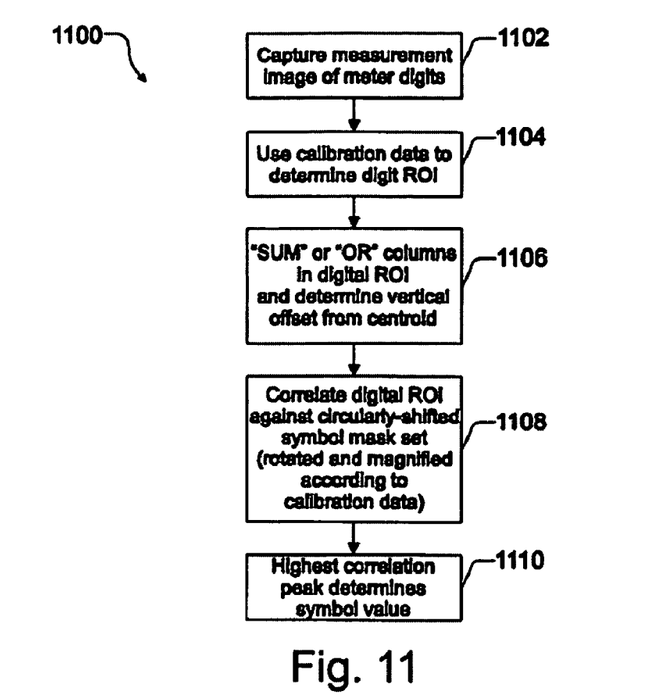
FIG. 11 is a flowchart of a method for the meter reading apparatus of FIG. 3 to read the digits displayed by the meter in one embodiment of the invention.

FIG. 11 illustrates a method 1100 for apparatus 300 to read the current values of the digits displayed by meter 100 in one embodiment of the invention. Method 1100 can be implemented with software executed by microprocessor 306.

In step 1102, microprocessor 306 instructs image sensor 302 to capture a measurement image 1202 (FIG. 12) of meter 100. Measurement image 1202 is similar to calibration image 502 except the digits and their locations may vary. Measurement image 1202 is stored in memory 304.

In step 1104, microprocessor 306 uses the nominal center position of a digit determined in method 400 to locate a region of interest in image 1202 (e.g., a region 1204 in FIG. 12) that would include one or more digits.

Figure 13:
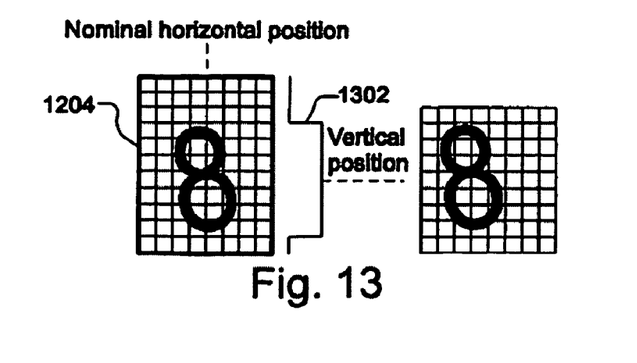
FIG. 13 illustrates the determination of the vertical position of a digit and the correlation of that digit against a symbol in one embodiment of the invention.
Figure 14:
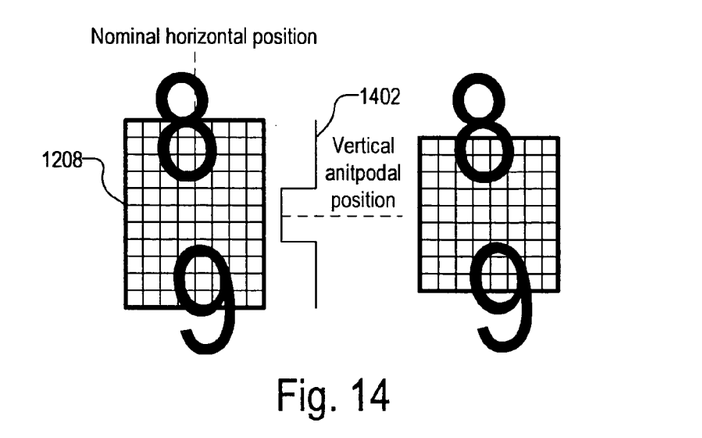
FIG. 14 illustrates the determination of the vertical antipodal position of two partial digits and the correlation of the two partial digits against two partial symbols in one embodiment of the invention.

In step 1106, microprocessor 306 determines the vertical position of the one or more digits in region 1204. Microprocessor 306 performs the "or" operation to the pixels in the rows of region 1204 to generate a curve. As shown in FIG. 13, a curve 1302 having a protruding step would result if the entire digit is visible in region 1204. The center of this step is the vertical position of the digit. As shown in FIG. 14, a curve 1402 having an inward indentation would result if two digits are partially visible in a region of interest (e.g., region 1208). The center of this indent is the vertical position of the antipodal position between the two digits.

In step 1108, microprocessor 306 correlates region 1204 against the symbols in the symbol mask set. As shown in FIG. 15, the symbol mask set can be individual symbols or symbols in a single mask image with known symbol size and symbol offsets. The symbol mask set may be rotated and sized according to the optimal calibration values.

If one digit is fully visible in region 1204 as shown in FIG. 13, microprocessor 306 correlates region 1204 against the symbols by aligning the center position of the digit in region 1204 and the center position of the symbols. In one embodiment, microprocessor 306 correlates region 1204 and the symbols by multiplying corresponding pixels and summing the products to determine a correlation value. The digit is assumed to have the value of the symbol that produces the highest correlation value.

If two digits are partially visible in a region (e.g., region 1208 as shown in FIG. 14), microprocessor 306 correlates region 1208 against portions of the symbol image retrieved according to the vertical antipodal position of the two digits in region 1208. Specifically, microprocessor 306 determines offsets AA, BB . . . II of respective intermediate portions 1501, 1502 . . . 1509 from the vertical antipodal position of symbols 8 and 9. Intermediate portions 1501 to 1509 each have two partial symbols that possibly correspond to the two partial digits in region 1208. In one embodiment, microprocessor 306 correlates region 1208 against intermediate portions 1501 to 1509 by multiplying corresponding pixels and summing the products to determine a correlation value. The two partial digits are assumed to have the values of the two partial symbols that produce the highest correlation value.

In step 1110, microprocessor 306 determines that the symbol or partial symbols that produce the highest correlation value for the digit or partial digits in region 1204. Microprocessor 306 sets the digit or partial digits in region 1204 to the value or values of the symbol or partial symbols.

Figure 12:
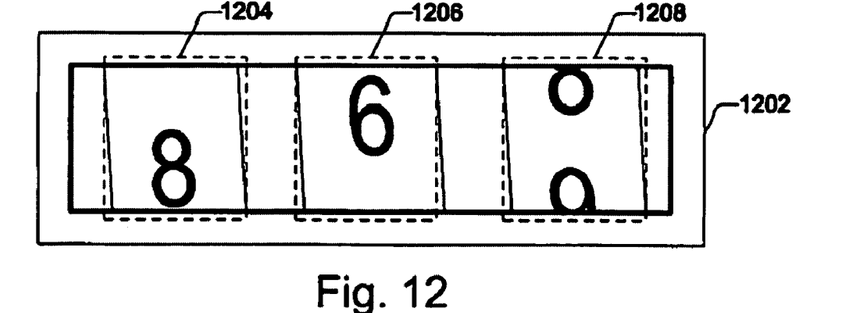
FIG. 12 illustrates a measurement image captured by the meter reading apparatus of FIG. 3 in one embodiment of the invention.

Steps 1104, 1106, 1108, and 1110 are repeated for the other regions of interests (e.g., regions 1206 and 1208) located by the nominal center positions of the digits located in those regions.

Various other adaptations and combinations of features of the embodiments disclosed are within the scope of the invention. Numerous embodiments are encompassed by the following claims.

What is claimed is:

1. A method for reading a meter, comprising:
    capturing an image of digits displayed by the meter for any fully visible digit;
    determining a vertical position of the digit;
    retrieving a symbol from a symbol mask set;
    aligning the symbol and the digit according to the vertical position of the digit;
    correlating the symbol and the digit, and
    for two digits in transition such that each of the two digits in transition is partially visible:
        determining an antipodal vertical position of the two digits in transition;
        retrieving an intermediate portion between adjacent symbols from the symbol set;
        aligning the intermediate portion and the two digits in transition according to the antipodal vertical position of the two digit; and
        correlating the intermediate portion and the two digits in transition.

2. The method of claim 1, further comprising repeating said retrieving, said aligning, and said correlating for other intermediate portions from the symbol mask set, wherein the two digits in transition are determined to have values of two symbols in one intermediate portion from the symbol mask set that produces a highest correlation value.

3. The method of claim 1, wherein:
    the symbol mask set comprises a single mask image comprising the symbols in a sequential order; and
    said retrieving an intermediate portion between adjacent symbols from the symbol mask set comprises retrieving a portion of the mask image according to the antipodal vertical position.

4. A method for reading a meter, comprising:
    capturing an image of digits displayed by the meter;
    roughly locating the digits in the image by correlating the entire image against symbols from a symbol mask set;
    after said roughly locating, precisely locating the digits by correlating the symbols against the symbols that are rotated, resized, and repositioned to maximize correlation between the symbols and the digits;
    determining nominal center positions of the digits;
    storing the nominal center positions of the digits in a non-volatile memory;
    capturing another image of the digits displayed by the meter;
    locating a region of interest according to one of the nominal center positions of the digits;
    for a fully visible digit in the region of interest;
        determining a vertical position of the digit;
        retrieving a symbol from the symbol mask set;
        aligning the symbol and the digit according to the vertical position of the digit; and
        correlating the symbol and the digit; and
    for two partially visible digits in the region of interest;
        determining an antipodal vertical position of the two digits;
        retrieving an intermediate portion between adjacent symbols from the symbol mask set;
        aligning the intermediate portion and the two partially visible digits according to the antipodal vertical position of the two partially visible digits; and
        correlating the intermediate portion and the two partially visible digits.

5. The method of claim 4, further comprising repeating said retrieving, said aligning, and said correlating for other intermediate portions from the symbol mask set, wherein the two digits are determined to have values of two symbols in one of the intermediate portions from the symbol mask set that produces a highest correlation value.

6. The method of claim 4, wherein;
    the symbol mask set comprises a single mask image comprising the symbols in a sequential order; and
    said retrieving an intermediate portion between adjacent symbols from the symbol mask set comprises retrieving a portion of the mask image according to the antipodal vertical position.

* * * * *

UNITED STATES PATENT AND TRADEMARK OFFICE
CERTIFICATE OF CORRECTION

PATENT NO.         : 7,460,711 B2                                                  Page 1 of 1
APPLICATION NO.    : 10/927712
DATED              : December 2, 2008
INVENTOR(S)        : Richard L. Baer et al.

It is certified that error appears in the above-identified patent and that said Letters Patent is hereby corrected as shown below:

Column 8, Line 14, Claim 4, delete "interest;" and insert -- interest: --;

Column 8, Line 20, Claim 4, delete "interest;" and insert -- interest: --;

Column 6, Line 36, Claim 6, delete "wherein;" and insert -- wherein: --.

Signed and Sealed this

Ninth Day of November, 2010

David J. Kappos
*Director of the United States Patent and Trademark Office*